(12) United States Patent
Pham

(10) Patent No.: US 12,246,621 B2
(45) Date of Patent: Mar. 11, 2025

(54) VEHICLE-BASED POWER-GENERATING SYSTEM COMPRISING MULTIPLE STACKED PAIRS OF COUNTER-ROTATING WIND TURBINE GENERATORS

(71) Applicant: Nghe Pham, Kenner, LA (US)

(72) Inventor: Nghe Pham, Kenner, LA (US)

( * ) Notice: Subject to any disclaimer, the term of this patent is extended or adjusted under 35 U.S.C. 154(b) by 0 days.

(21) Appl. No.: 18/119,568

(22) Filed: Mar. 9, 2023

(65) Prior Publication Data

US 2023/0311669 A1 Oct. 5, 2023

Related U.S. Application Data

(63) Continuation-in-part of application No. 17/389,638, filed on Jul. 30, 2021, now abandoned.

(51) Int. Cl.
| | |
|---|---|
| *B60L 8/00* | (2006.01) |
| *B60L 50/61* | (2019.01) |
| *F03D 3/00* | (2006.01) |
| *F03D 9/32* | (2016.01) |

(52) U.S. Cl.
CPC .............. *B60L 8/006* (2013.01); *B60L 50/61* (2019.02); *F03D 3/005* (2013.01); *F03D 9/32* (2016.05); *F05B 2240/14* (2013.01); *F05B 2240/941* (2013.01)

(58) Field of Classification Search
CPC .......... B60L 8/006; B60L 50/60; B60L 50/61; B60L 53/20; B60L 53/52; B60K 16/00; B60K 2016/006; F03D 3/002; F03D 3/005; F03D 3/0409; F03D 9/32; F05B 2240/14; F05B 2240/941; Y02E 10/728; Y02T 10/7072

USPC ......................................................... 290/1 R
See application file for complete search history.

(56) References Cited

U.S. PATENT DOCUMENTS

| | | | |
|---|---|---|---|
| 3,444,946 A | 5/1969 | Waterbury | |
| 4,305,254 A | 12/1981 | Kawakatsu | |
| 4,400,042 A | 8/1983 | Fritz | |
| 4,405,029 A | 9/1983 | Hunt | |
| 4,407,132 A | 10/1983 | Kawakatsu | |
| 4,523,793 A | 6/1985 | Frtiz | |
| 5,251,588 A | 10/1993 | Tsujii | |
| 5,280,827 A | 1/1994 | Taylor | |
| 5,287,004 A * | 2/1994 | Finley | F03D 9/25 180/2.2 |
| 5,345,761 A | 9/1994 | King | |
| 5,415,603 A | 5/1995 | Tuzuki | |
| 5,513,719 A | 5/1996 | Moroto | |
| 5,550,445 A | 8/1996 | Nii | |
| 5,562,565 A | 10/1996 | Moroto | |

(Continued)

*Primary Examiner* — Tulsidas C Patel
*Assistant Examiner* — S. Mikailoff
(74) *Attorney, Agent, or Firm* — Jerome Drabiak; Edison Law Group

(57) ABSTRACT

An improved electrical power-generating system for an electric vehicle powered by at least one rechargeable battery and for a hybrid vehicle powered, at least in part, by at least one rechargeable battery. Each vehicle includes an upper portion and a lower portion spaced from the upper portion. The power-generating system includes a first pair of wind turbines arranged in a first airflow channel located in the lower portion; and a second pair of wind turbines arranged in a second airflow channel in the upper portion. The first and second wind turbines are operatively connected to the at least one battery.

3 Claims, 10 Drawing Sheets

(56) References Cited

U.S. PATENT DOCUMENTS

| | | | |
|---|---|---|---|
| 6,700,215 B2* | 3/2004 | Wu | F03D 9/32 |
| | | | 290/55 |
| 6,882,059 B1 | 4/2005 | DePaoli | |
| 6,897,575 B1 | 5/2005 | Yu | |
| 7,808,121 B1* | 10/2010 | Glynn | F03D 9/25 |
| | | | 290/55 |
| 7,810,589 B2* | 10/2010 | Frierman | F03D 9/32 |
| | | | 180/2.2 |
| 7,997,371 B2* | 8/2011 | Khymych | F03D 13/20 |
| | | | 180/2.2 |
| 8,169,182 B1 | 5/2012 | Kimble | |
| 8,710,691 B2 | 4/2014 | Haddad | |
| 9,057,357 B2 | 6/2015 | Patel | |
| 9,428,061 B1 | 8/2016 | Ripley | |
| 10,358,039 B1* | 7/2019 | Frierman | F03D 3/02 |
| 11,794,591 B2* | 10/2023 | Hewitt | H02K 16/005 |
| 2003/0057707 A1* | 3/2003 | Wu | F03D 9/32 |
| | | | 290/55 |
| 2011/0031043 A1 | 2/2011 | Armani | |
| 2011/0100731 A1 | 5/2011 | Hassan | |
| 2012/0085587 A1 | 4/2012 | Drouin | |
| 2013/0263911 A1* | 10/2013 | Bryson | F03D 9/11 |
| | | | 415/224 |
| 2017/0298907 A1* | 10/2017 | Menaskanian | H02K 16/00 |
| 2017/0342964 A1* | 11/2017 | Cianflone | F03D 9/32 |
| 2019/0270386 A1* | 9/2019 | Chang | F03D 9/32 |
| 2023/0030205 A1* | 2/2023 | Pham | B60L 8/006 |
| 2023/0211685 A1* | 7/2023 | Pham | B60L 53/20 |
| | | | 320/107 |

* cited by examiner

VEHICLE-BASED POWER-GENERATING SYSTEM COMPRISING MULTIPLE STACKED PAIRS OF COUNTER-ROTATING WIND TURBINE GENERATORS

REFERENCE TO RELATED APPLICATION

This patent application is a continuation-in-part ("CIP") of U.S. patent application Ser. No. 17/389,638 filed Jul. 30, 2021, hereby incorporated by reference in its entirety.

FIELD

The present subject matter, directed in general to power-generating systems, is directed to improvements in power-generating systems for electric and hybrid vehicles.

BACKGROUND

"Hybrid" vehicles powered by batteries and internal combustion (IC) engines are known. Also known are EVs (electric vehicles) powered only by batteries. EVs and hybrid vehicles are replacing vehicles powered only by IC engines, as transport means along roads. Wind energy recovery systems for charging and/or re-charging batteries of electric or hybrid vehicles are disclosed, e.g., in US 2012/0085587 to Drouin; US 2011/0100731 to Hassan; US 2011/0031043 to Armani et al.; U.S. Pat. No. 3,444,946 to Waterbury and U.S. Pat. No. 5,280,827 to Taylor et al., U.S. Pat. No. 6,882,059 to DePaoli; U.S. Pat. No. 6,897,575 to Yu; U.S. Pat. No. 8,169,182 to Kimble; U.S. Pat. No. 8,710,691 to Haddad; U.S. Pat. No. 9,057,357 to Patel et al.; and U.S. Pat. No. 9,428,061 to Ripley. Mechanisms disclosed in these prior art references are either inefficient for various reasons or potentially unstable in operation.

For instance, careful review of prior art noted above discloses mechanisms that have not solved the problem of "drag" upon the vehicle imposed by the wind power-based mechanisms disclosed. Many, such as U.S. Pat. No. 5,280,827 to Taylor et al. are either unnecessarily complex in design or are very large in relation to the size of an EV or hybrid vehicle using them. Size and gross weight of an EV or hybrid vehicle is an important factor in determining range of an EV or hybrid vehicle, since heavy vehicles tend to waste power unnecessarily when accelerating from a full stop or from lower speeds to a higher speed.

To solve the "drag" problem, often created at the backside of an EV, by operation of wind-power mechanisms designed to charge or recharge the EV batteries, I developed a system that includes at least two air stream-powered mechanisms. During its operation, I discovered ways to use at least two air streams to "balance" air flow while minimizing drag, which surprisingly results in a vacuum region being created at the backside of an EV, which is desirable, since I have that such vacuum regions provide an EV with thrust.

The present subject matter makes use of air flow into a vehicle to convert that air flow into usable electrical power. It is, of course, understood that laws of thermodynamics and efficiencies of the system of the present subject matter limit the amount of electrical power that can be generated. It was therefore surprising to discover, when comparing: (1) energy generated by the vehicle, to energy used by the vehicle to overcome a rolling resistance of the vehicle due to the weight of the vehicle and friction of the vehicle tires along a road surface; (2) wind resistance due to aerodynamic drag on the vehicle traveling through air; (3) internal resistance and efficiency losses of mechanical components of the system; and (4) conversion efficiency of transforming rotating turbine energy into usable electrical power—that the system of the present subject matter is more stabilize, simpler in design, and more efficient in operation than prior art systems disclosed in the art noted.

Furthermore, when analyzing these disclosures, while mindful of the underlying laws of thermodynamics, it is therefore understood that the system of the present subject matter cannot generate power to power an EV or hybrid or vehicle indefinitely. Rather, the improved power-generating system of the present subject matter was designed to use efficiently designed wind turbines to power EVs and hybrid vehicles along roads, for the purpose of reducing the electrical power consumption rates of EVs and hybrid vehicles.

In operation, an improved power-generating system of the present subject matter has been found to be useful at high vehicle speeds when aerodynamic drag on a vehicle is high and when wind turbine components of the power-generating system of the present subject matter are spun at high speeds. The power-generating system of the present subject matter is capable of providing electrical power influx to a power-generating system including at least one re-chargeable battery for offsetting energy usage of an EV or hybrid vehicle and for extending an EV or hybrid vehicle range between predetermined battery re-charging stops for the EV, or re-fueling stops for the hybrid vehicle, in relation to an EV or hybrid vehicle not having the power-generating system of the present subject matter.

SUMMARY

The present subject matter is directed to an improved electrical power-generating system for an electric vehicle powered by at least one rechargeable battery, or for a hybrid vehicle powered, at least in part, by at least one rechargeable battery, or for both vehicles. Each vehicle includes an upper portion and a lower portion spaced from the upper portion. The power-generating system includes a first pair of wind turbines cooperatively arranged in a first airflow channel located in the lower portion; and a second pair of wind turbines cooperatively arranged in a second airflow channel within the upper portion of the vehicle. The first and second wind turbines are operatively connected to the at least one battery.

The vehicle has a first air intake communicating with the first airflow channel along a first forward portion of the vehicle and includes a second air intake communicating with the second airflow channel along a second forward portion of the vehicle. The vehicle has a first air exhaust communication with the first airflow channel along a first trailing portion of the vehicle and includes a second air exhaust communicating with the second airflow channel along a second trailing portion of the vehicle. Airflow through the first airflow channel and the second airflow channel, thereby causes the first pair of wind turbines as well as the second pair of wind turbines, respectively, to recharge the at least one battery.

BRIEF DESCRIPTION OF THE FIGURES

Throughout the drawing figures and detailed description which follow, I shall use similar reference numerals to refer to similar components for my present subject matter.

DETAILED DESCRIPTION

The present subject matter is directed to an improved power-generating system for an electric-powered vehicle or a hybrid-powered vehicle. The term vehicle, throughout this patent specification shall include—but not be limited to—a bus, a car, and a truck.

Because the present subject matter involves improvements in power-generating systems designed for electric and/or hybrid vehicles, U.S. Pat. No. 3,444,946 to Waterbury and U.S. Pat. No. 5,280,827 to Taylor et al. and U.S. Pat. No. 6,882,059 to DePaoli and U.S. Pat. No. 6,897,575 to Yu; U.S. Pat. No. 8,169,182 to Kimble; U.S. Pat. No. 8,710,691 to Haddad; U.S. Pat. No. 9,057,357 to Patel; and U.S. Pat. No. 9,428,061 to Ripley are all hereby incorporated by reference in their entirety.

Moreover, to provide a detailed disclosure of hybrid vehicles satisfying enablement and other requirements of 35 USC § 112, U.S. Pat. Nos. 4,305,254 and 4,407,132, both to Kawakatsu et al.; and U.S. Pat. No. 4,405,029 to Hunt and U.S. Pat. No. 5,251,588 to Tsujii et al.; and U.S. Pat. No. 5,345,761 to King et al. and U.S. Pat. No. 5,415,603 to Tuzuki et al. and U.S. Pat. Nos. 5,513,719 and 5,562,565, both to Moroto et al.; as well as U.S. Pat. No. 5,550,445 to Nii, all of which disclose prior art hybrid automotive vehicles, are each hereby incorporated by reference in their entirety as well.

To balance air flow, I designed two elongated airflow tubes, parallel spaced, which I call airflow "channels," for inclusion within the design of the vehicle. Each of these channels is arranged to draw an air stream from a vehicle front side and exhaust that drawn in air stream out the vehicle back side. In particular, the two air streams, because of my present design, are channeled essentially along a path aligned with the direction of the vehicle, which I discovered creates forward thrust along the backside of most vehicles.

Figure 1:
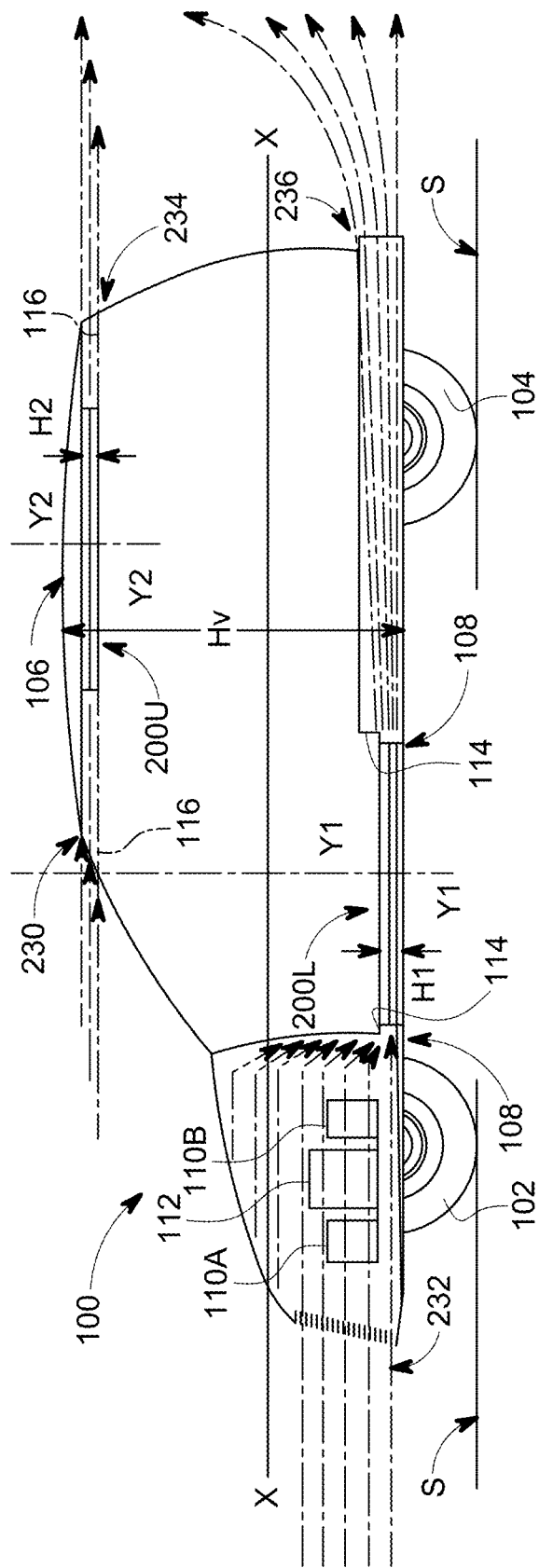
FIG. 1 is a side view of a vehicle, with select side sections of the vehicle removed, to show certain components of a power-generating system of the present subject matter.
Figure 2:
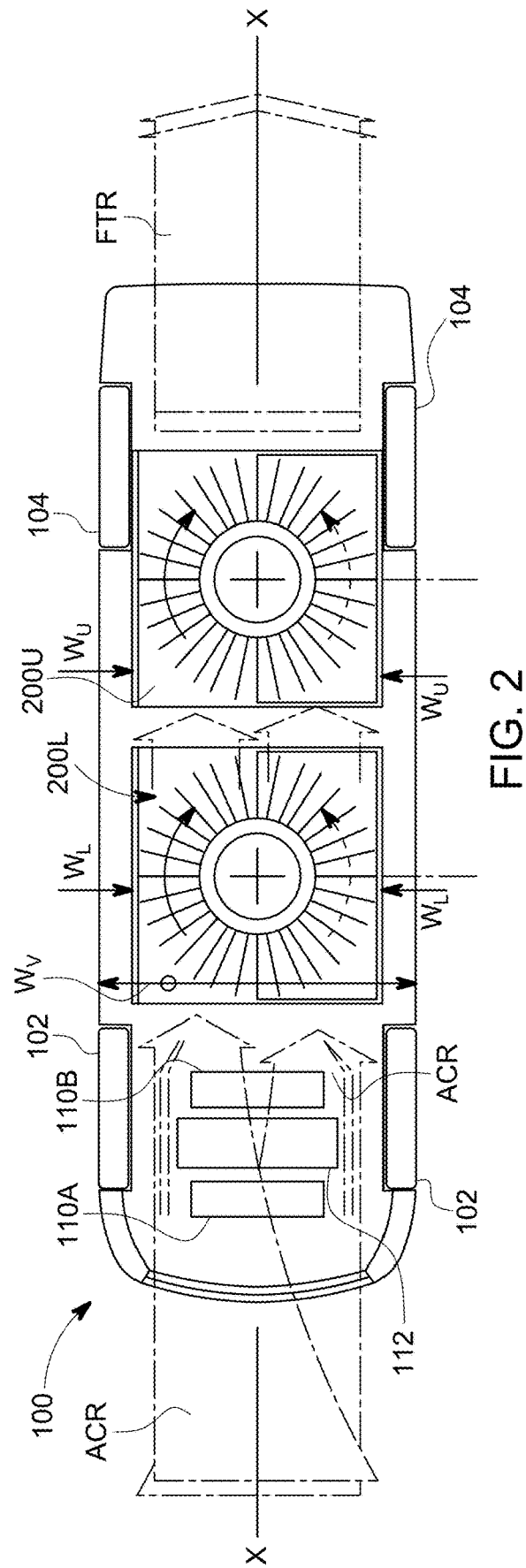
FIG. 2 depicts a partially transparent plan view of the vehicle presented in FIG. 1.

Referring to FIGS. 1 and 2, an illustrative vehicle 100, including a spaced-apart pair of front tires 102 (FIG. 2) and a spaced-apart pair of back tires 104 (FIG. 2), is shown oriented along a longitudinal, horizontal axis X-X (FIGS. 1 and 2). The vehicle 100 also includes an upper portion 106 and a lower portion 108 spaced from the upper portion 106.

Contained within the vehicle 100 are a pair of operatively connected batteries 110A and 110B and an internal-combustion engine 112, all of which are spaced between the front wheels 102 for propelling the vehicle 100—forward, backward, and so forth—over a road surface S. When the vehicle 100 is operated by a driver in hybrid mode, without the internal-combustion engine 112, the vehicle 100 is powered by at least one of the batteries 110A and 110B. Within the vehicle 100, a first airflow channel 114, arranged parallel to the road surface S, is included within the lower portion 108 and a second airflow channel 116, also parallel with road surface S, is included within the upper portion 106.

Figure 3:
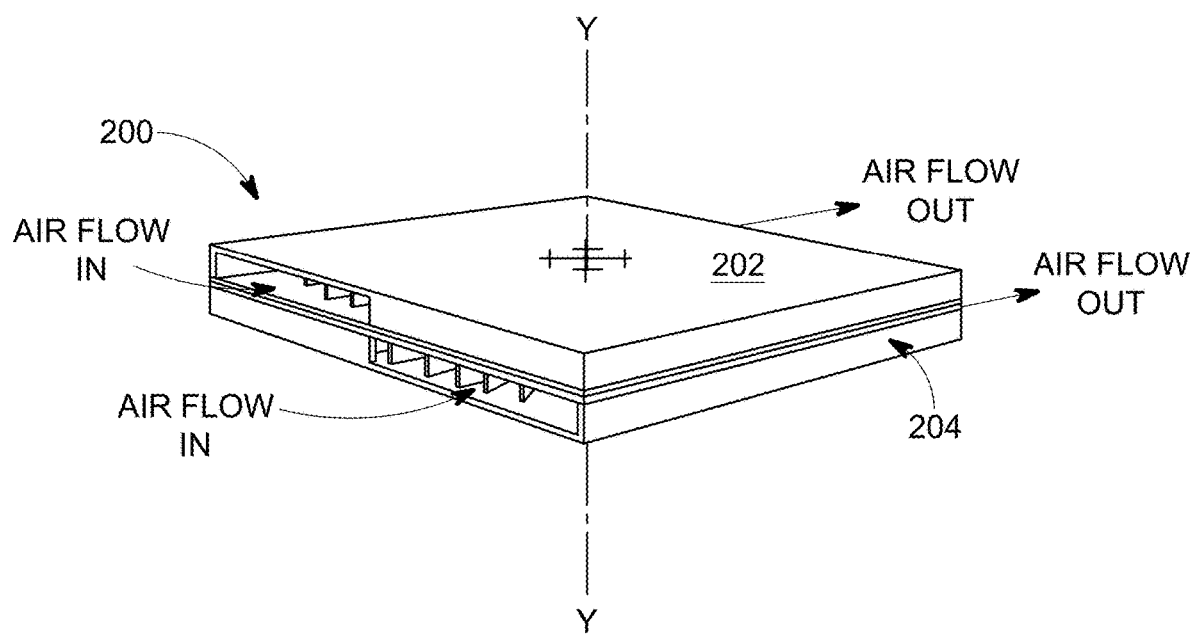
FIG. 3 is a perspective view, on an enlarged scale, relative to certain components of the electrical power-generating system of the present subject matter shown in FIG. 2.
Figure 4:
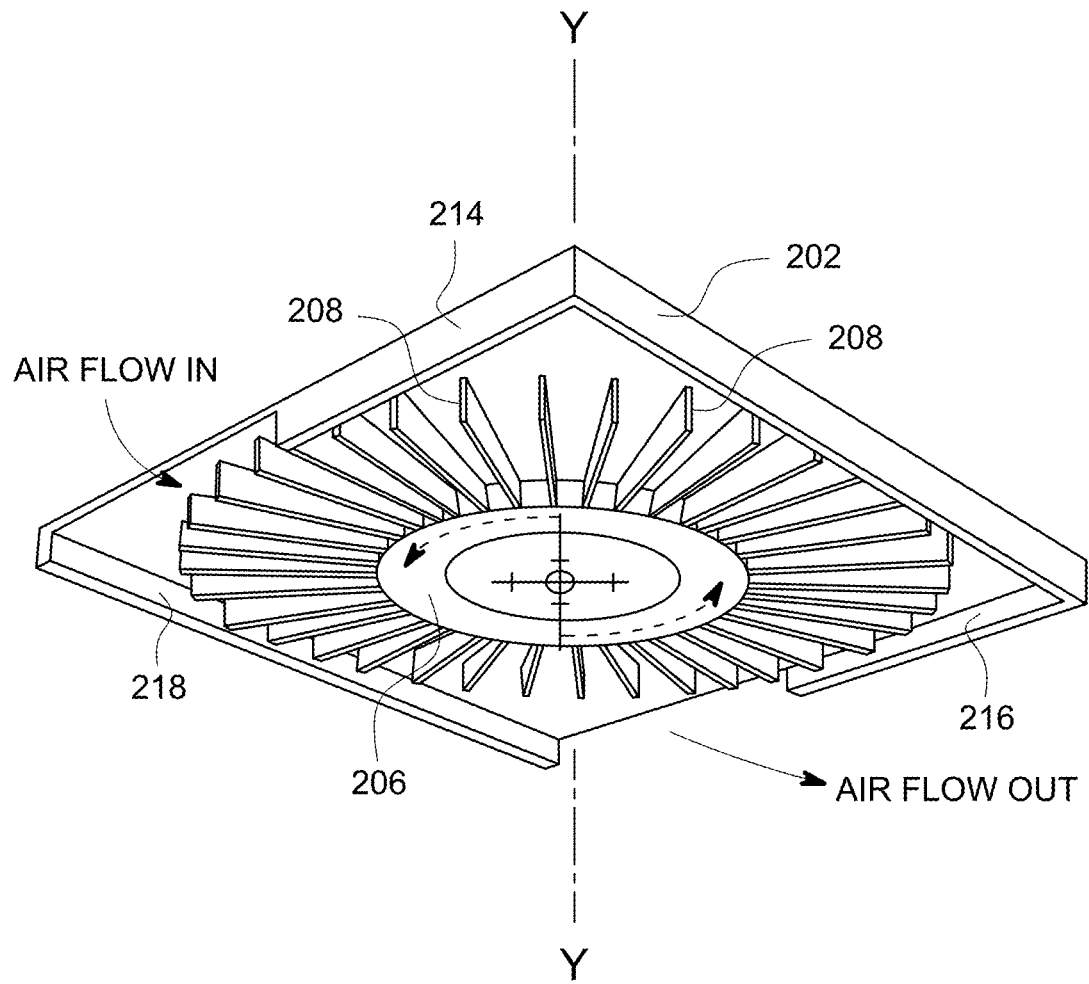
FIG. 4 is an underside view, in perspective, of an upper housing and an upper wind turbine assembly rotatable within the housing about a vertical axis, based upon FIG. 3.
Figure 5:
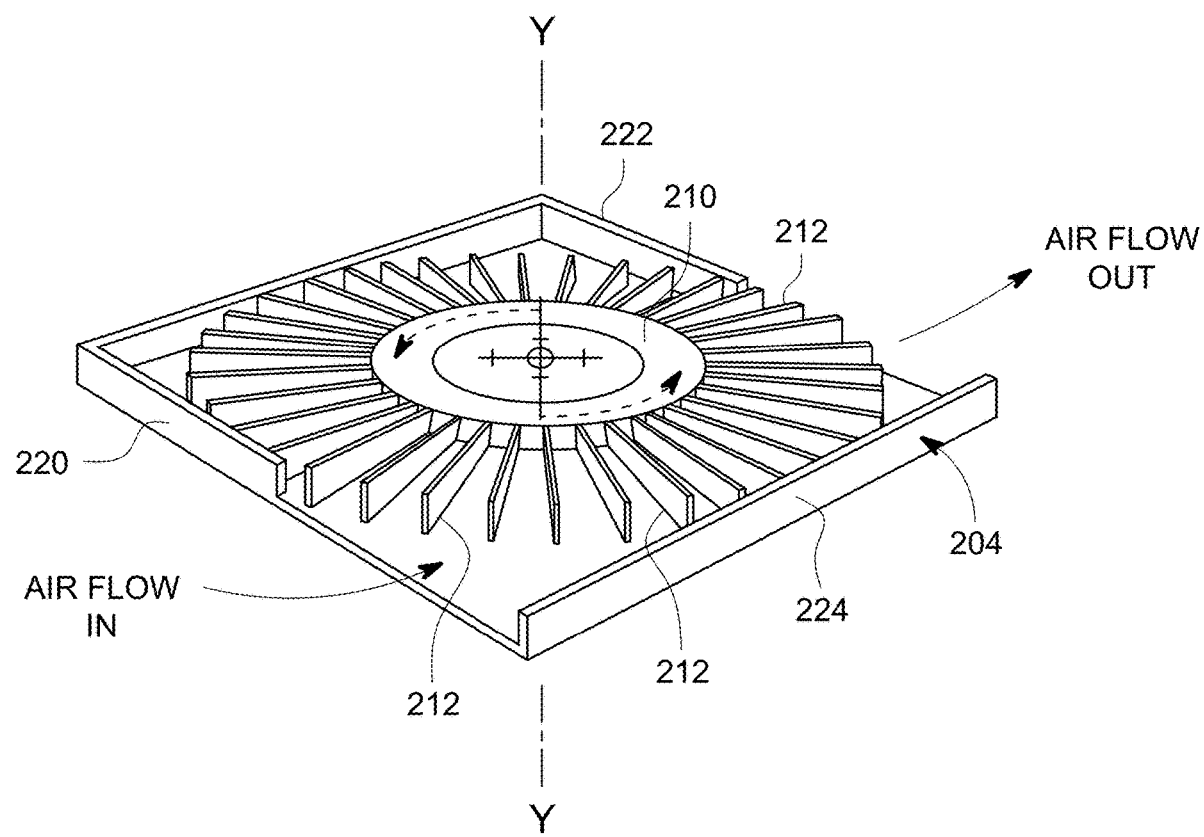
FIG. 5 is an upper surface view, in perspective, of a lower housing and lower wind turbine assembly rotatable within the housing about a vertical axis, based upon FIG. 3.

Referring next to FIGS. 3-5, a wind-driven turbine assembly 200 (FIG. 3) includes an upper housing 202 (FIG. 4), a lower housing 204 (FIG. 5), an upper electrical-power generator 206, and its attached plurality of radially outwardly extending fan blades 208. Each fan blade 208 is equally spaced seriatim, circumferentially, from its two nearest neighbor blades 208. A rotatable portion of generator 206 including the plural fan blades 208 (attached to the rotatable portion of generator 206) are rotatably mounted within the upper housing 202 about a vertical axis Y-Y. The generator 206 and the plural fan blades 208 are referred to as an upper "wind turbine" in this patent specification. The wind-driven turbine assembly 200 also includes a lower electrical-power generator 210 and its attached plurality of radially outwardly extending fan blades 212. The generator 210 and its attached fan blades 212 are rotatably mounted within the lower housing 204 about the vertical axis Y-Y and are referred to as a lower "wind turbine" in this patent specification.

From the upper housing 202, a lower surface (not shown) was removed to present the details of the generator 206 and the fan blades 208 rotatably mounted therewithin. The upper and lower housings 202 and 204 are each square-shaped when viewed from above and are each relatively thin when viewed from the side. A first lateral side surface 214 (FIG. 4) and a second side surface 216, spaced opposite the first lateral side surface 214, each of which (i.e., side surfaces 214 and 216) provide an opening, which is about 45 to about 48% of the surface area of another lateral side surface (either side surface 202 or 218) spaced between the first and second side surfaces 214 and 216. Air inlet and outlet openings extend from an edge of lateral surface 218 orthogonal to the sides 214, 216. Airflow through the upper housing 202 thus causes the generator 206 and attached fan blades 208 to rotate clockwise about the vertical axis Y-Y when viewed from above.

From the lower housing 204 (please refer to FIG. 5), an upper surface (not shown) was removed to present details of a generator 210 and its plural attached fan blades 212 rotatably mounted therewithin. A first lateral side surface 220 and a second lateral side surface 222 spaced opposite the first lateral side surface 220 each provide an opening (for airflow), which is about 45-48% of the surface area of another lateral side surface 224 spaced between the first and second sides 220 and 222 and extending from an edge of the lateral surface 224 orthogonal to the first and second side surfaces 220 and 222. Airflow through lower housing 204 thus causes the generator 210 and attached fan blades 212 to rotate counterclockwise about the vertical axis Y-Y when viewed from above.

Please note that FIGS. 3-5 are illustrative, to describe in detail operation of select components associated with the upper and lower generators 206 and 210. In operation (FIGS. 1, 2), vertical axes of rotation (shown in FIGS. 3-5), are offset and described below.

Referring to FIG. 1, vehicle 100 includes an upper air intake 230 communicating with upper airflow channel 116 (providing airflow to drive upper generator 206) along a forward or leading upper portion of vehicle 100 and a lower air intake 232 communicating with the lower airflow channel 114 (providing airflow to drive lower generator 210) along a forward or leading lower portion of the vehicle 100. In FIG. 2, an air compression region (ACR) is shown. An upper portion of the ACR supplies compressed air to the upper air intake 230 when the vehicle 100 is moving forward and a lower portion of the ACR supplies compressed air to the lower air intake 232 when vehicle 100 is moving forward.

The vehicle 100 further includes an upper air exhaust 234 communicating with the upper airflow channel 116 along a trailing or rearward upper portion of the vehicle 100 and a lower air exhaust 236 communicating with the lower airflow channel 114 along a rear or trailing lower portion of the vehicle 100. I have found that a forward thrust region (FTR) is generated at the backside of vehicle 100 (FIG. 2) when the vehicle 100 is moving forward and compressed air is discharged from upper and lower air exhausts 234, 236.

Referring again to FIGS. 1 and 2, pursuant to principles of the present subject matter, the vehicle 100 is shown including an upper compressed-air or wind-driven turbine assembly 200U and a lower wind-driven turbine assembly 200L. Each wind-driven turbine assembly 200U and 200L includes its generator (206, 210), its plural attached fan blades (208, 212) and its housings (including airflow inlets and outlets), as described in relation to FIGS. 3-5. The upper and lower wind-driven turbine assemblies 200U, 200L are operatively connected to batteries 110A, 110B for providing generated electrical energy to the batteries 110A, 110B, for charging and/or recharging the batteries 110A and 110B, for enabling the batteries 110A, 110B to propel vehicle 100 forward, backward, or around a curve (along a road surface S), as desired, by an operator or a driver of the vehicle 100.

In operation, the upper wind-driven turbine assembly 200U (FIG. 1) provides the vehicle 100 with an upper pair of wind turbines rotatably arranged within the upper airflow channel 116 formed within the upper portion 106 of vehicle 100; and the lower wind-driven turbine assembly 200L provides vehicle 100 with a lower pair of wind turbines rotatably arranged within the lower airflow channel 114 formed within lower portion 108. For lower wind-driven turbine assembly 200L, its generator and plural attached fan blades rotate about a first vertical axis Y1-Y1 transverse to longitudinal axis X-X and parallel to road surface S. For upper wind-driven turbine assembly 200U, its generator and attached fan blades rotate about a second vertical axis Y2-Y2 transverse to longitudinal axis X-X and parallel to surface S. The first and second vertical axes Y1-Y1, Y2-Y2 are parallel.

The sum of a lower height H1 for the lower wind-driven turbine assembly 200L when added to an upper height H2 for the upper wind-driven turbine assembly 200U is about 5-7% of a height Hv of the vehicle 100, excluding the physical dimensions attributable to the wheels 102 and 104 (FIG. 1). The width WL of the lower wind-driven turbine assembly 200L, is the same as the width WU of the upper wind-driven turbine assembly 200U. Each is about 75-80% of a width Wv for a body portion of vehicle 100.

Figure 6:
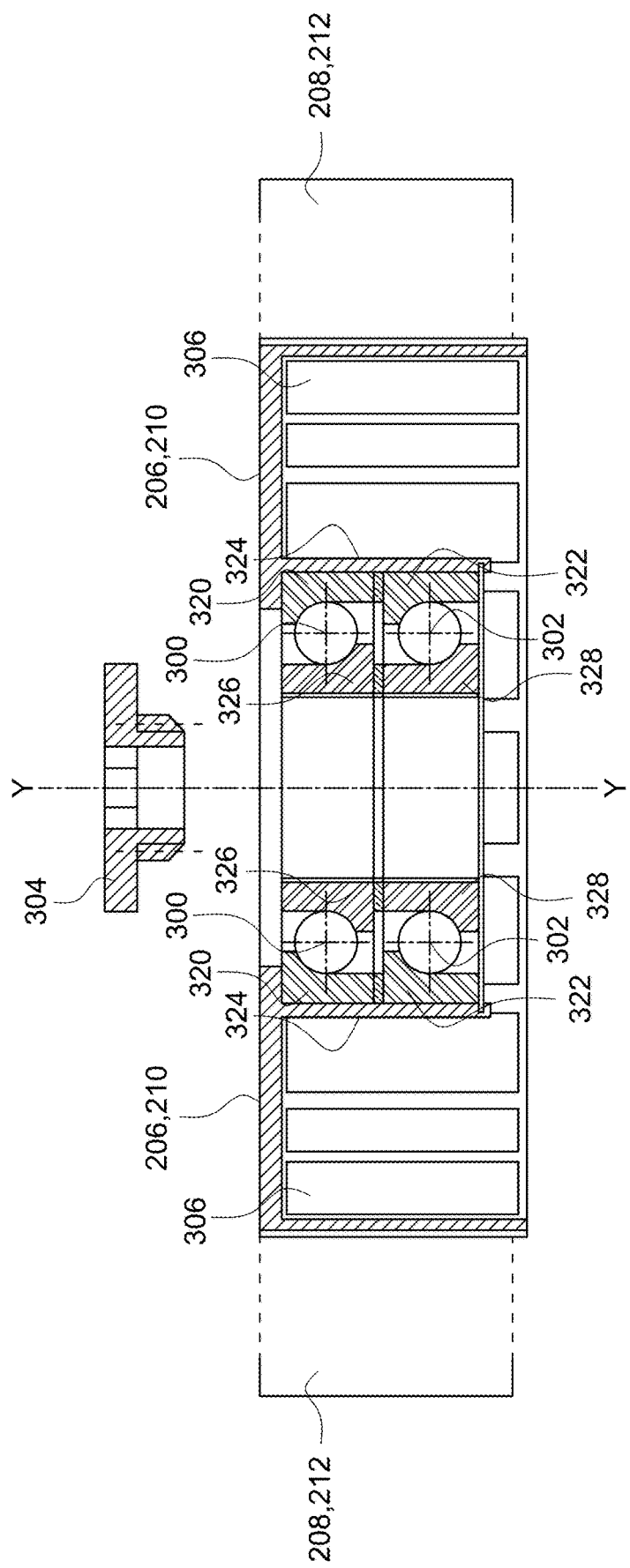
FIG. 6 is a partially exploded, side elevational sectional view, based on FIG. 4, of certain components of the vehicle power-generating system of the present subject matter.
Figure 7:
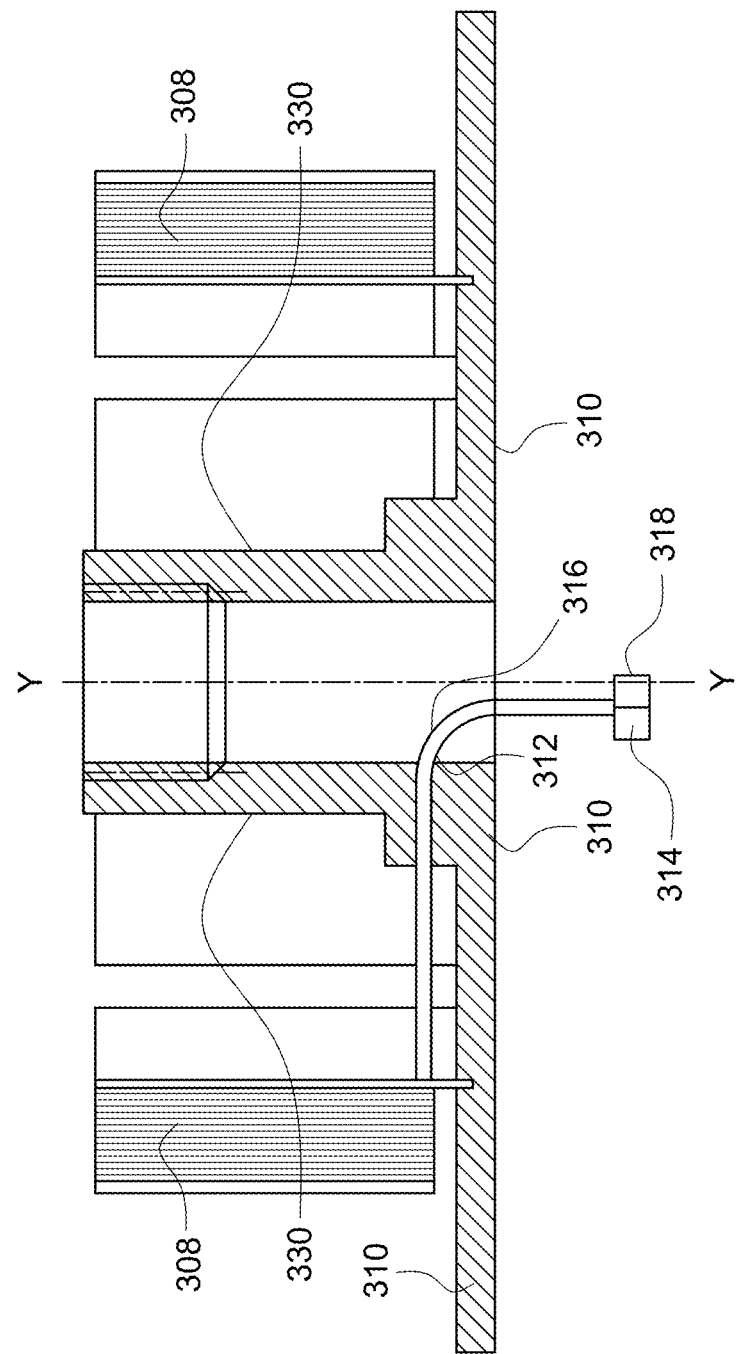
FIG. 7 is an assembled, side elevational sectional view, based on FIG. 6, of certain other components of the vehicle power-generating system of the present subject matter.

Referring to FIGS. 6 and 7, components of the vehicle 100, which are associated with the electrical power-generating system of the present subject matter, shall now be described in detail. The rotatable portion of each of the upper generator 206 and the lower generator 210, to which a plurality of fan blades 208, 212 (noted by dotted lines to indicate they are longer than shown in FIG. 6) are respectively attached. The upper and lower generators 206, 210 each include upper and lower bearing assemblies 300, 302. The rotatable portion of each of the upper and lower generators 206, 210 also includes permanent magnets 306. Electrically connected coils 308 are fixed to a base portion 310 (FIG. 7) which remains stationary relative to the generators 206, 210 which rotate about an illustrative vertical axis Y-Y, shown in FIGS. 3 through 7. A bearing block nut 304 is adapted, dimensioned, and configured to removably secure outer races 320, 322 of the respective bearing assemblies 300, 302 to an integral collar 324 of the upper and lower generators 206, 210 as well as inner races 326, 328 of the respective bearing assemblies 300, 302 to an integral collar 330 of the stationary base portion 310 (which does not rotate about the vertical axis Y-Y). When the vehicle 100 is in operation, rotation of the upper and lower generators 208, 210 causes the magnets 306 to rotate about the axis Y-Y, relative to the stationary coils 308, thereby causing the coils 308 to generate an electrical current. The electrical current, thus generated, is then passed via an electrical connector 312 to a current output terminal 314 operatively connected to the batteries 110A, 110B. To complete an electrical connection between the batteries 110A, 110B, the base portion 310 includes a second electrical connector 316 extending between the one of the coils 308 and a current input terminal 318 operatively connected to the batteries 110A, 110B.

Figure 8:
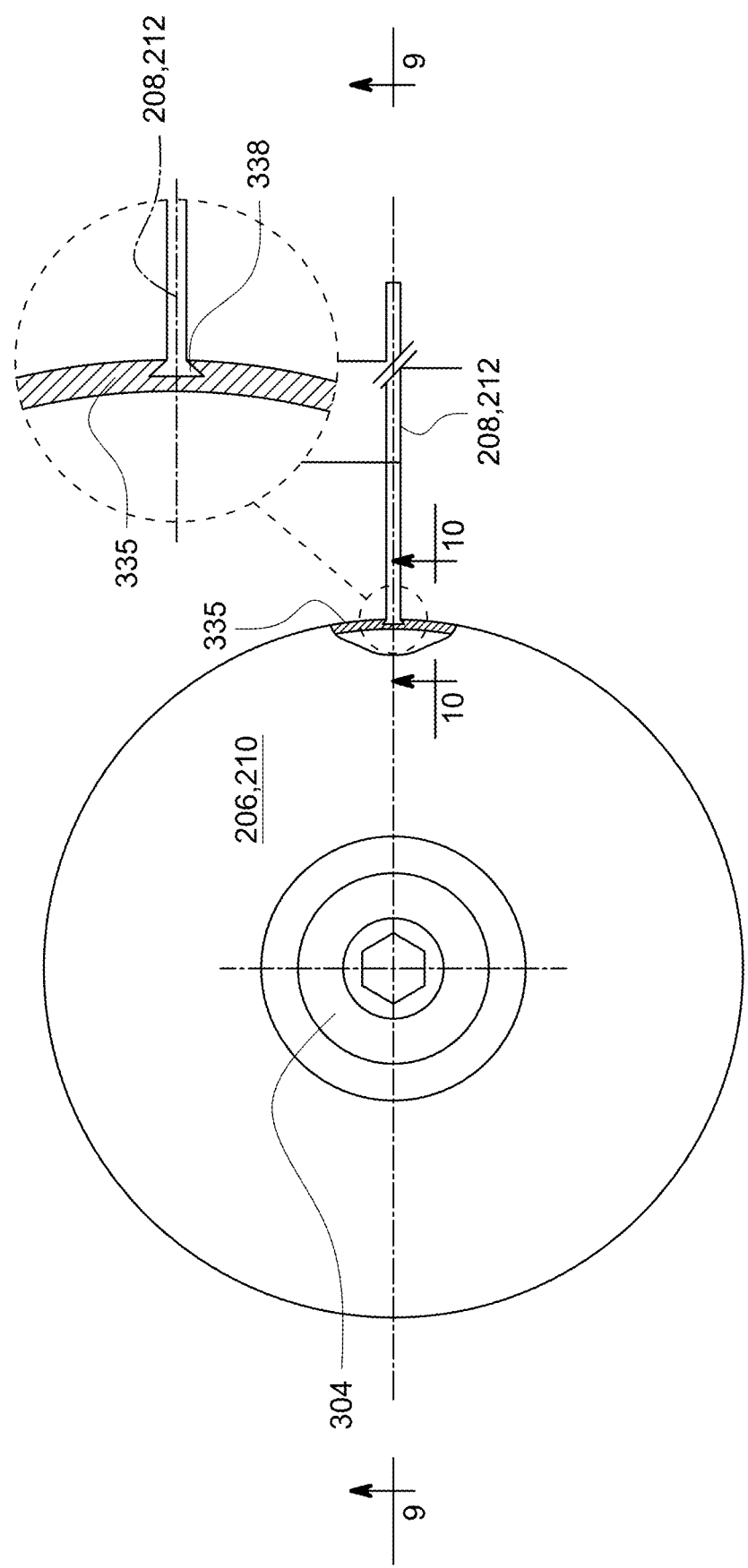
FIG. 8 depicts an upper, plan view of an electrical-power generator of the present subject matter, in which only one fan blade is depicted (shortened, to present attachment).
Figure 9:
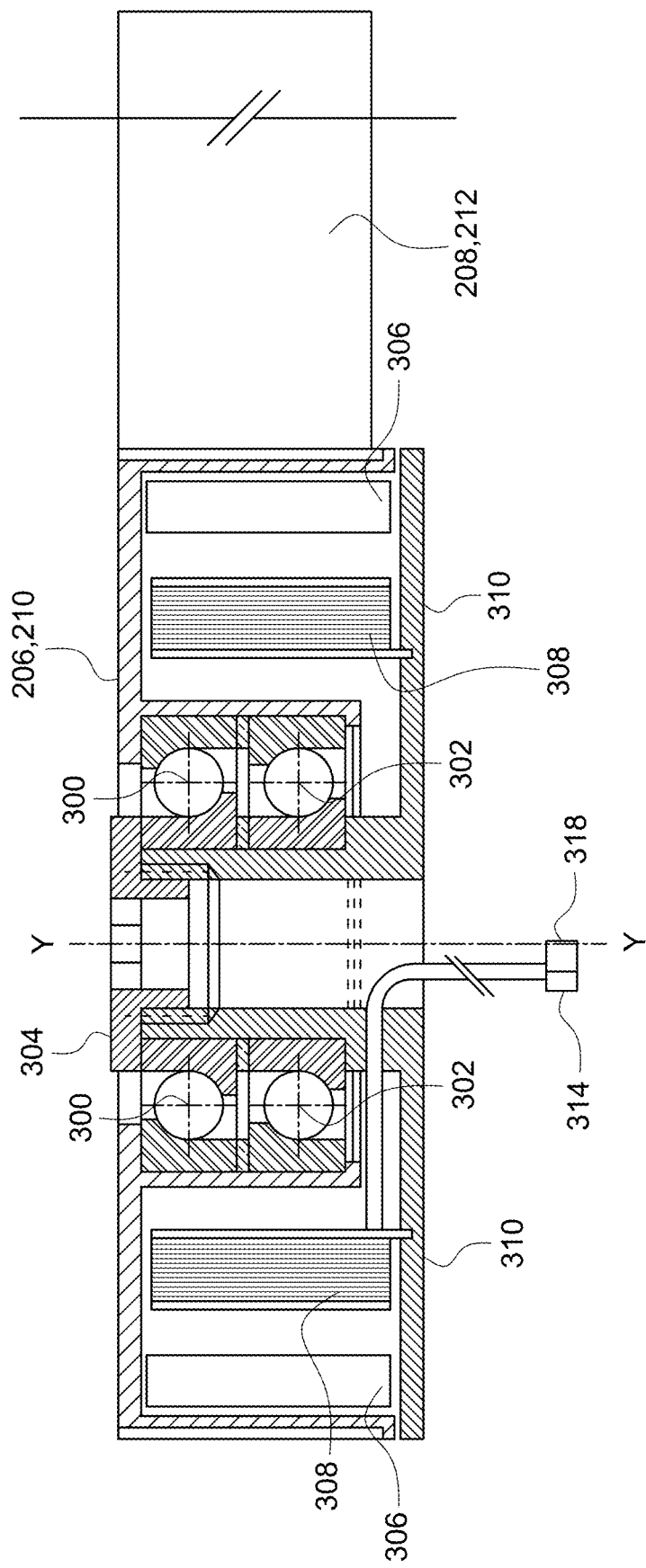
FIG. 9—an assembled version of FIGS. 6 and 7—presents a sectional view of the electrical-power generator of the present subject matter, from the plane 9-9 in FIG. 8.
Figure 10:
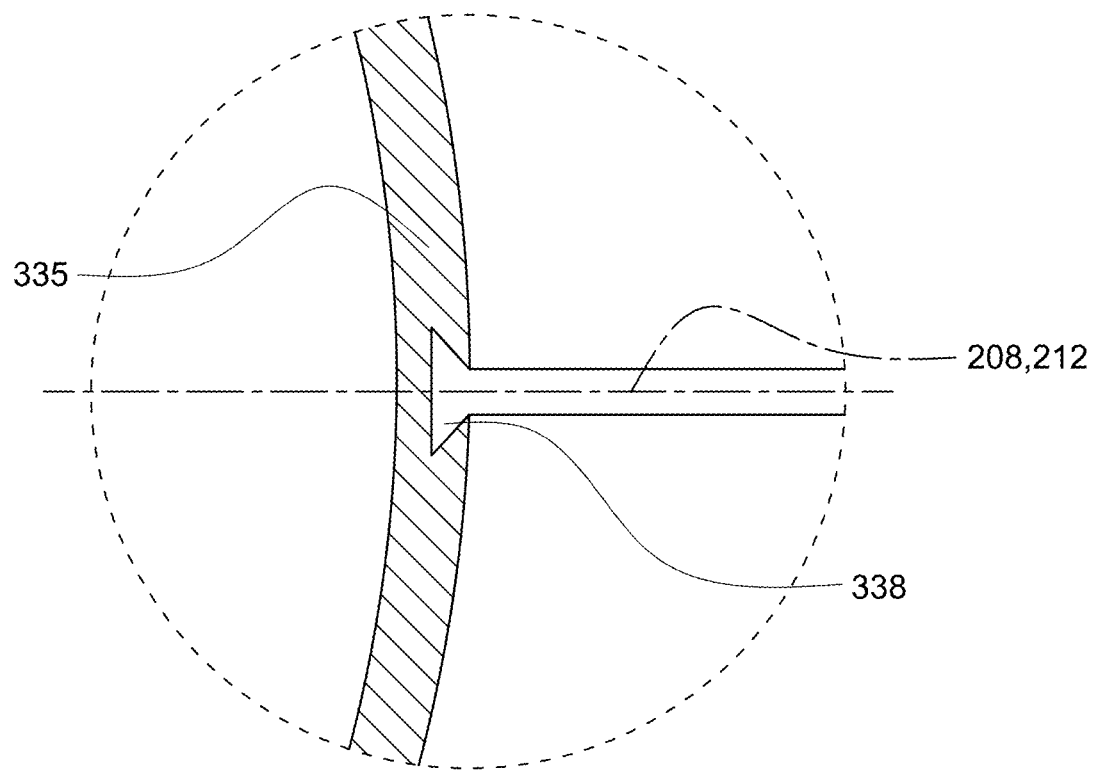
FIG. 10 shows an enlarged, detailed view of a feature from lines 10-10 in FIG. 8.

Referring to FIGS. 8, 9 and 10, additional structural details of the upper and lower generators 206, 210 shall now be described in detail. FIG. 8 depicts an upper, plan view of the electrical-power generators 206, 210 of the present subject matter, in which only one fan blade 208, 212 is depicted (in a lengthwise shortened fashion), to clearly show a detail for attaching each fan blade 208 and 212 to its respective generator 206 and 210.

FIG. 9, which is a side elevational, sectional view taken from the plane 9-9 in FIG. 8, provides an assembled version of FIGS. 6 and 7 (except for the single fan blade).

FIG. 10 presents a detail for securing each fan blade 208, 212 to its associated generator 206, 210. Each generator 206, 210 includes a circular sidewall 335 in which is formed a plurality of triangular niches 338 circumferentially equally spaced about the external circular sidewall 335, and formed within the sidewall 335 such that each fan blade 208, 212 extends radially outwardly from the sidewall 335 (only one niche 338 is shown). Each fan blade 208, 212 has an end portion that snuggly fits within each such niche 338.

The electrical power-generating system of the present invention, described above, is an improvement over power-generating systems of known electric and hybrid vehicles disclosed in the prior art in various ways. For instance, the upper and lower wind-driven turbine assemblies 200U, 200L (FIG. 1) provide airflow inlets and outlets about 75-80% of the width of a body portion of a vehicle. Fan blades occupy about 37.5-40% of the width of the vehicle body portion. Airflow through the upper and lower turbine assemblies 200U, 200L is parallel with a normal forward-direction-of-travel for a vehicle. Height of upper and lower turbine assemblies 200U and 200L, in total, is about 5-7% of the height of a vehicle. Wind-driven turbine assemblies 200U, 200L (described above) are efficient and could be even more efficient if constructed of aluminum, other light-weight metals or light weight, high-strength composite materials. Additional efficiencies could be achieved by using high efficiency bearings (e.g., U.S. Pat. Nos. 4,400,042 and 4,523,793, both to Fritz, both of which are hereby incorporated by reference in their entirety) in the electrical-power generators.

Electric and hybrid vehicles equipped with a pair of spaced-apart parallel airflow channels aligned with a path-of-travel of the vehicle over a road surface, discharging air streams from a vehicle backside, as described, create a thrust zone along a vehicle backside to further power a vehicle forward. Thus, balanced pressurized air streams, as described, can increase the forward propulsion efficiency of hybrid and electric vehicles.

Illustrated and described in detail in this patent specification is an improved power-generating system for an electric-powered and hybrid-powered vehicle. While the present subject matter has been described with reference to an illustrated embodiment, the present subject matter is not limited to the illustrated embodiment. On the contrary, many alternatives, changes, and/or modifications will become apparent to a person of ordinary skill in the art ("POSITA") after this patent specification and its FIGS. have been reviewed. Thus, alternatives, changes, and modifications are to be treated as forming a part of the present subject matter insofar as they fall within the spirit and scope of appended claims.

I claim:

1. A vehicle comprising a longitudinal axis and at least one rechargeable battery, the vehicle configured to be driven on a horizontal road surface in both forward and rearward directions of travel, the longitudinal axis of the vehicle being parallel to the road surface, the vehicle further comprising:
   a lower airflow channel disposed within a lower portion of the vehicle, the lower airflow channel fluidly connected to a lower air intake to receive a lower incoming airflow therefrom when the vehicle is moving in the forward direction of travel, the lower airflow channel fluidly connected to a lower air exhaust to exhaust the lower received airflow in the rearward direction;
   an upper airflow channel disposed within an upper portion of the vehicle, the upper airflow channel fluidly connected to an upper air intake to receive an upper incoming airflow therefrom when the vehicle is moving in the forward direction of travel, the upper airflow channel fluidly connected to an upper air exhaust to exhaust the upper received airflow in the rearward direction;
   a first wind-driven turbine assembly operatively arranged within the lower airflow channel to be actuated by the lower received airflow, the first turbine assembly comprising a first pair of vertically stacked wind turbine generators, the first pair of wind turbine generators comprising a first upper wind turbine generator and a first lower wind turbine generator;
   a second wind-driven turbine assembly operatively arranged within the upper airflow channel to be actuated by the upper received airflow, the second turbine assembly comprising a second pair of vertically stacked wind turbine generators, the second pair of wind turbine generators comprising a second upper wind turbine generator and a second lower wind turbine generator;
   wherein the first upper wind turbine generator and the first lower wind turbine generator each comprises
      a housing having a width and a height,
      a wind turbine comprising a plurality of fan blades radially extending from a central hub, and
      an electrical power generator integrated within the central hub of the wind turbine,
   wherein the width of the housing of the first upper wind turbine generator is equal to the width of the housing of the first lower wind turbine generator, and
   wherein the first upper and the first lower wind turbine generators are configured to rotate in opposite directions about a first common vertical axis, the first vertical axis being perpendicular to the longitudinal axis of the vehicle;
   wherein the second upper wind turbine generator and the second lower wind turbine generator each comprises
      a housing having a width and a height,
      a wind turbine comprising a plurality of fan blades radially extending from a central hub, and
      an electrical power generator integrated within the central hub of the wind turbine,
   wherein the width of the housing of the second upper wind turbine generator is equal to the width of the housing of the second lower wind turbine generator, and
   wherein the second upper and the second lower wind turbine generators are configured to rotate in opposite directions about a second common vertical axis, the second vertical axis being perpendicular to the longitudinal axis of the vehicle;
   wherein, upon forward motion of the vehicle, the first pair of vertically stacked wind turbine generators are actuated by the lower received airflow and the second pair of vertically stacked wind turbine generators are actuated by the upper received airflow, to thereby generate electricity to recharge the at least one rechargeable battery;
   wherein the widths of the housings of the first upper, the first lower, the second upper, and the second lower wind turbine generators are all between 75% and 80% of a width of the vehicle.

2. The vehicle of claim 1, wherein the vehicle is an electric vehicle and is powered by the at least one rechargeable battery.

3. The vehicle of claim 1, wherein the vehicle is a hybrid vehicle and further comprises an internal combustion engine;
   wherein the hybrid vehicle is powered by the internal combustion engine and the at least one rechargeable battery.

* * * * *